United States Patent
Huhtanen et al.

(10) Patent No.: US 6,231,916 B1
(45) Date of Patent: May 15, 2001

(54) COMPOUND FEED CONTAINING HISTIDINE AND PROCESS FOR ITS PREPARATION

(75) Inventors: Pekka Huhtanen, Vantaa; Tuomo Varvikko, Hajala; Aila Vanhatalo, Jokioinen; Ilmo Aronen, Hinnerjoki; Merja Holma, Raisio, all of (FI)

(73) Assignee: Rehuraisio Oy, Rasio (FI)

( * ) Notice: Subject to any disclaimer, the term of this patent is extended or adjusted under 35 U.S.C. 154(b) by 0 days.

(21) Appl. No.: 09/202,350

(22) PCT Filed: Aug. 11, 1997

(86) PCT No.: PCT/FI97/00471

§ 371 Date: Jul. 12, 1999

§ 102(e) Date: Jul. 12, 1999

(87) PCT Pub. No.: WO98/06275

PCT Pub. Date: Feb. 19, 1998

(30) Foreign Application Priority Data

Aug. 12, 1996 (FI) .......................................... 963146

(51) Int. Cl.⁷ ..................................... A23K 1/14
(52) U.S. Cl. .............................. 426/623; 426/2; 426/630; 426/635; 426/807
(58) Field of Search ................................... 426/623, 630, 426/635, 807, 2

(56) References Cited

U.S. PATENT DOCUMENTS

| 5,145,695 | 9/1992 | Smith et al. | 426/2 |
| 5,219,596 | 6/1993 | Smith et al. | 426/2 |

FOREIGN PATENT DOCUMENTS

| 0 728 418 A1 | 8/1996 | (EP) . |
| 1 497 211 | 1/1978 | (GB) . |
| WO 96/08169 | 3/1996 | (WO) . |
| WO 96/23421 | 8/1996 | (WO) . |

OTHER PUBLICATIONS

WPI Accession No. 90–146493, SU 1496748 A, *Agric Livestock Phy,* "Veal–meat–stock rearing–by supplementing barley–based feed material with amino–acids such as methionine, lysine, histidine over controlled growth period", abstract Jul. 1989.

Patent Abstracts of Japan, JP 2231041 A, Itochu Shiryo KK, "Low Proteinaceous feed for growing domestic chickens— comprises controlled amts. of amino acids e.g. histidine or tryptophan, and vitamin(s) and inorganic salts" Sep. 1990.

Chemical Abstracts, vol. 105, No. 17, Oct. 27, 1986, Aitova et al, "Amino Acids in Nutrition of High–Producing Cows", pp. 599–600, The Abstract No. 151969k, Zhivotnovodstvo 1986 (6), 48–49 (Russ.).

Chemical Abstracts, vol. 107, No. 9, Aug. 31, 1987, Aitova, "Amino Acid Supply of Lactating Cows Fed Hay–Silage- –Concentrate Rations", p. 606, The Abstract No. 76668x, Nauchn. Tr.—Vses. Nauchno. 1986, 32, 13–22 (Russ.).

Choung et al, "The Effects of Intravenous Supplements of Amino Acids on the Milk Production of Dairy Cows Consuming Grass Silage and a Supplement Containing Feather Meal", *J. Sci. Food Agric.* 1995, 68, 265–270.

*Primary Examiner*—Chhaya D. Sayala
(74) *Attorney, Agent, or Firm*—Connolly Bove Lodge & Hutz

(57) ABSTRACT

The object of the invention is a compound feed to be given especially as a silage supplement, for increasing the protein-fat-ratio of the milk and improving nitrogen utilization of a dairy cow. The compound feed is characterized in that its crude protein content is not more than 14% by weight as calculated from the weight of the compound feed, whereby the histidine fraction of the crude protein preferably is between 2.8 to 4.0% by weight.

25 Claims, No Drawings

COMPOUND FEED CONTAINING HISTIDINE AND PROCESS FOR ITS PREPARATION

The present invention is based on identifying the first limiting amino acid in milk production and the use of this knowledge in designing feeds and in the feeding of cows. More specifically, the object of the invention is the use of histidine in a compound feed for dairy cows for increasing the protein-fat ratio in the milk and to improve nitrogen utilization.

In most countries today milk protein is the most important ingredient in milk, whereas the importance of the fat content has diminished as a result of changes in consumer habits. The consumption of cheese has increased, the consumption of milk fats, has, however, decreased. The change in preferences is also reflected in the pricing of milk. Earlier the production price paid for milk was positively affected by a high fat content. Nowadays a high price is paid for the milk protein fraction.

Ten essential amino acids (arginine, phenyl alanine, histidine, isoleucine, leucine, lysine, methionine, threonine, tryptophane and valine) are needed for the production of milk protein. All natural proteins, as well as the rumen-produced proteins contain all these amino acids. Milk protein can be produced only in such an amount for which the most limiting amino acid suffices. In such a situation production is not increased even if the availability of the other amino acids were to be increased. Instead the animal has to excrete the excessive amino acids.

The purpose of feeding is to provide the cow with nutrients in optimal ratios so that they are directed as effectively as possible to form milk protein rather than milk fat. In this manner, also nitrogen utilization in feeding is improved, thus also providing for a less polluted environment. Nitrogen burdens nature in two ways, as ammonia in the air and as nitrate in the soil or the ground water. In milk production, nitrogen losses can be reduced by means of a proper diet so as to reduce the excretion of nitrogen in the manure and urine by directing the nitrogen containing nutrients more effectively to form milk proteins.

The protein requirement of a ruminant is comprised of the amino acid requirement of the animal itself as well as the requirement of the rumen microbes for nitrogen containing compounds. It is known today that the microbes need amino acids and peptides in addition to simple nitrogen compounds. Central reactions of the rumen are the partial degradation of feed proteins and the simultaneous synthesis of microbial protein, as well as absorption of ammonia through the rumen wall into the blood circulation. Part of the protein is transported undegraded to the small intestine wherein it is absorbed in the form of amino acids into the blood circulation. The nutritional value of this undegraded feed protein is dependant on its amino acid composition and digestability in the small intestine. In the rumen, the microbes form microbial protein from the nitrogen containing feed compounds. Also the amino acids from the microbial protein are absorbed from the small intestine. In a high-producing dairy cow, the amino acids from the microbial protein are not sufficient to satisfy the need of the animal but, in addition, high-quality protein compound feed is needed from which the small intestine is provided with the desired amino acids. The amino acids absorbed from the small intestine are transported with the blood circulation also for the needs of the mammary gland, wherein i.a. milk protein is produced.

The biological gross efficiency of a dairy cow in protein production can be expressed as the nitrogen (or protein) contained in the milk as a fraction of the nitrogen consumed by the animal. The nutrients consumed by the animal are never utilized to one hundred percent in the end products, because the vital functions are based on biological processes wherein always some losses occur. However, by balancing the diet in the correct manner, the nitrogen losses can be decreased. For example, the balance and ratios of amino acids in the feed and after digestion in the blood circulation affect milk yield, milk composition and nitrogen utilization. So far, sufficient knowledge about amino acid feeding has not been available which could be adapted to the conditions of our country.

The excretion of nitrogen from animals can be reduced by optimizing the amino acid composition in the diet, and thus by improving the retention of nitrogen in the animal product while maintaining the nitrogen level of the diet. The goal is a more effective metabolism and lesser nitrogen losses in the urine. Alternatively, by optimizing the amino acid composition of the diet, the use of nitrogen in the diet can be reduced without reducing the yield. This leads to lesser nitrogen losses in the gastrointestinal tract, whereby the nitrogen losses in both the urine and manure are reduced.

In many countries the diet of cows consists to a large degree of the use of grass silage. Grass silage is supplemented with compound or concentrate feed. From the point of view of nitrogen utilization some problems are associated with a silage diet. In addition to an excessive nitrogen content, also the quality of the silage protein increases the dietary problems. By shifting the harvesting of silage to take place one week earlier, the nitrogen content of grass silage can be increased, but it still does not remove the need for high quality supplementary protein. Positive results have been obtained with an addition of protein compound feed despite the fact that the protein content of the silage feed has been high. Thus, silage still needs protein with a high-quality amino acid composition in the form of a feed supplement.

During recent years, the optimal amino acid composition of feed supplements has been the object of some study in various countries. In many studies the starting point has been the replication of the milk amino acid profile. In some studies, wherein the diet is based on the use of corn silage, positive results have been obtained with lysine and methionine supplements. In some countries it is thus seriously believed that lysine and methionine are the first milk production limiting amino acids in dairy cows. However, in a diet based on grass silage, lysine and methionine supplements have not given an additional benefit.

When evaluating the optimal protein composition of the diet of cows the starting point should, however, not only be the amino acid profile of milk, because the amount of amino acids passing from the blood circulation into the mammary gland to be excreted with the milk from the mammary gland is not necessarily always the same. Some of the essential amino acids (phenyl alanine, tyrosine, methionine and tryptophane) are, it is true, passed from the blood circulation into the mammary gland to the same degree as they are secreted from the mammary gland. Other essential amino acids (arginine, branched amino acids, threonine, lysine and histidine) pass from the blood circulation into the mammary gland to a much higher degree than are removed with the milk. Some of these essential amino acids are degraded in the mammary gland and their amino groups are used for the production of non-essential amino acids.

In this invention it has been shown for the first time that in a silage-based diet for dairy cows, histidine is the first limiting amino acid in the milk production of cows.

According to the invention it has thus been observed that the protein-fat ratio in the milk of dairy cows can be increased and nitrogen utilization improved by giving to the cow supplementary histidine in the form of a compound feed, when care is taken at the same time that the total crude protein in the compound feed is kept below a specific limit value. Thus according to the invention, the histidine content in the compound feed is increased in relation to the other amino acids in the compound feed.

The object of the invention is thus a compound feed, which contains feed components conventionally used in compound feeds, the crude protein content of which is not more than 14% by weight, as calculated from the whole weight of the compound feed, at least 2.8% by weight of the crude protein being comprised of histidine.

According to a preferred embodiment, the histidine content is appr. 2.8 to 4.0, preferably 2.8 to 3.0% by weight of the total crude protein. The crude protein content is advantageously at least 9, more preferred 10 to 12% by weight as calculated from the whole weight of the compound feed.

When, according to the invention, the protein diet of cows is supplemented so as to increase the amount of histidine to be given with the compound feed, as compared to a normal basic feed, from the normal level which, depending on the feed components used, is appr. 2.0 to 2.5% by weight of the total crude protein, both milk production and milk protein production increase. The fat content, on the other hand, decreases, wherefore the ratio between milk protein and fat changes in the desired direction. At the same time, the total crude protein content in the compound feed is limited to values generally below the normal values for compound feed which are usually above 14%, whereby smaller nitrogen losses are obtained. It has been shown in tests that by supplementing the diet to balance the histidine therein, one can obtain 4 g of milk protein with one gram of histidine. Nitrogen utilization is thus improved substantially.

An object of the invention is also a process for the production of the above defined compound feed, according to which a) the compound feed components are combined with such a quantity of histidine so as to obtain a compound feed mixture having a crude protein content of not more than 14% by weight and a histidine content of at least 2.8% by weight, preferably 2.8 to 4.0% by weight of the crude protein, or b) the components of the compound feed mixture are combined in a qualitative and quantitative manner so that the crude protein content of the feed mixture so obtained is not more than 14% by weight and the histidine content is at least 2.8% by weight, preferably 2.8 to 4.0% by weight of the crude protein.

The histidine level in the diet can thus be increased by adding supplementary histidine to the feed. The protein and especially the histidine of the mixture is hereby preferably in a form which is protected from degradation in the rumen. Such methods for protecting amino acids are well known and they can be either chemical or physical. The chemical methods include i.a. protecting the amino or carboxy group of the amino acid with a suitable protecting group, which is removed after the rumen, for example, through hydrolysis, thus forming the free amino acid. The physical methods include encapsulation of the amino acid in a suitable material which withstands the conditions of the rumen but which is degraded after the rumen thus liberating the amino acid. Such materials are, for example, various celluloses and derivatives thereof, suitable pH-sensitive polymers, or fats (Buttery, P. J. et al., *Recent Advances in Animal Nutrition*, (1985), p. 19–33; Block, S. M. et al., *J. Dci Food Agric* 1994, 65, 441–447; Rulquin, H., *Feed Mix* Vol. 2, No. 4 1994). Rumen degradation can also be reduced by treating the feed chemically or physically, that is with water/steam and heat, and optionally under increased pressure. Using physical and chemical methods, rumen degradation has been reduced typically appr. 10 to 70%.

It is also possible to obtain the desired histidine content in the compound feed by optimizing the raw materials of the the feed mixture in a qualitative and quantitative manner so that the histidine content in the final feed is adjusted to the desired level. Optimal raw materials are those which have a high histidine content, but which do not have a high total crude protein content.

In the following table the crude protein contents, and the content of histidine in the crude protein, for some typical feed raw materials used in Finland are shown.

|  | Histidine % of crude protein | Crude protein g/kg |
|---|---|---|
| Barley | 2.3 | 108 |
| Oat | 2.2 | 115 |
| Molasses | 2.7 | 49 |
| Barley fiber | 1.9 | 162 |
| Wheat bran | 2.6 | 148 |
| Wheat middlings | 2.5 | 173 |
| Sugarbeet pulp | 2.5 | 107 |
| Rapeseed meal | 2.8 | 344 |
| Soybean meal | 2.6 | 458 |

In the compound feed according to the invention all conventional compound feed components or raw materials can be used, for example the raw materials mentioned below in the indicated amounts. The amounts mentioned in parenthesis are preferable amounts. The feed components to be used according to the invention are preferably all of plant origin, but, in addition, milk-based products, such as casein products can be used. Independently of the composition of the recipe, the histidine content can be adjusted to the desired level by adjusting the amount of added histidine. The crude protein level of the recipe should, however, be at the most 140 g/kg.

|  | % by weight |
|---|---|
| grain (barley, oat) | 0–85 (30–40) |
| bran (wheat, oat) | 0–60 (15–20) |
| wheat middlings | 0–30 (5–10) |
| sugarbeet pulp | 0–60 (10–20) |
| oilseed meal (rapeseed, soya) | 0–30 (10–20) |
| molasses | 0–10 (4–6) |
| minerals | 0–10 (3–4) |
| vegetable oil | 0–5 (0–1) |
| histidine | 0.01–0.2 |

In the recipe, also other raw materials can be added, if desired (0–30%) such as malt feed, brewers' grains, haymeal, grassmeal, distillers' grains, etc. Normally the silage diet of a cow is supplemented with the compound feed of the invention in an amount of 1 to 20 kg/cow/day.

In the following tests are described in which the effect of a protein supplement on the milk protein level has been studied in dairy cows using a grain compound feed-silage diet.

As the control feed, a grain compound feed+silage was used. In the tests, the protein supplement in the diet was obtained by adding rapeseed, in the amounts indicated in the table (tests 1–10).

Also a further test (test 11) was carried out wherein histidine (6.5 g) was given with the control instead of rapeseed. Test 12 was carried out similarly as test 11 by giving histidine (6.5 g) and, in addition, 250 g of glucose to prevent the use of glucogenic amino acids as glucose precursors. Test 13 was carried similarly by giving histidine (6 g) and 250 g of glucose.

| Test | Rape seed | Increase in milk protein vs control (g/d) | Increase in crude protein vs control (g/d) | Histidine as % of crude protein/crude protein of compound feed |
| --- | --- | --- | --- | --- |
| 1 | 1.9 | +43 | +518 | 2.51/150 |
| 2 | 0.944 | +53 | +305 | 2.41/150 |
| 3 | 0.584 | +2 | +84 | 2.35/122 |
| 4 | 1.157 | +32 | +218 | 2.44/135 |
| 5 | 1.75 | +25 | +319 | 2.50/150 |
| 6 | 0.87 | +17 | +163 | 2.41/145 |
| 7 | 1.8 | +70 | +415 | 2.52/170 |
| 8 | 1.0 | +47 | +265 | 2.05/160 |
| 9 | 2.0 | +71 | +443 | 2.2/180 |
| 10 | 3.0 | +118 | +705 | 2.33/200 |
| Average | 1.5 | +48 | +344 | 2.37/154 |
| 11 | | +26 | +37 | 2.97/110 |
| 12 | | +57 | +74.2 | 2.97/139 |
| 13 | | +58 | +47.5 | 3.1/112 |

From the table it can be seen that when supplementing a grain compound feed silage diet with rapeseed protein, on an average 31.4 g of rapeseed meal was needed for producing one additional gram of of milk protein. When the supplement was made with histidine, an addition of 6.5 g of histidine gave an additional 26 g of milk protein, that is 0.25 g of histidine was needed for one additional gram of milk protein.

THE INVENTION IS ILLUSTRATED WITH THE FOLLOWING EXAMPLES

EXAMPLE 1

A feed was made by mixing the following components:

| | % by weight |
| --- | --- |
| Oat | 20.0 |
| Barley | 20.0 |
| Wheat bran | 18.0 |
| Wheat middlings | 7.7 |
| Sugarbeet pulp | 20.0 |
| Wheat molasses | 5.0 |
| Vegetable oil | 0.6 |
| Rapeseed meal | 5.65 |
| Minerals and vitamins | 3.0 |
| Histidine | 0.05 |

In the feed obtained, the crude protein content was 120 g/kg and the crude protein contained 3.0% by weight of histidine.

EXAMPLE 2

A feed was made using the following components:

| | % by weight |
| --- | --- |
| Oat | 10.0 |
| Barley | 20.0 |
| Wheat middlings | 7.0 |
| Wheat bran | 13.6 |
| Sugarbeet pulp | 25.0 |
| Rapeseed meal | 15.7 |
| Wheat molasses | 8.0 |
| Vegetable oil | 0.6 |
| Histidine | 0.06 |

In the feed obtained, the crude protein content was 140 g/kg and the crude protein contained 3.0% by weight of histidine.

EXAMPLE 3

A feed was made using the following components:

| | % by weight |
| --- | --- |
| Oat | 5.0 |
| Barley | 26.0 |
| Wheat middlings | 10.0 |
| Wheat bran | 19.3 |
| Sugarbeet pulp | 25.0 |
| Rapeseed meat | 5.7 |
| Wheat molasses | 8.0 |
| Vegetable oil | 0.6 |
| Histidine | 0.06 |

In the feed obtained, the crude protein content was 120 g/kg and the crude protein contained 3.0% by weight of histidine.

What is claimed is:

1. A compound feed for increasing the milk protein-fat ratio and improving nitrogen utilization based on a mixture of feed components, characterized in that its crude protein content is not more than 14% by weight and the histidine content of the crude protein is at least 2.8%.

2. The compound feed according to claim 1, characterized in that the histidine content is about 2.8 to 4.0% by weight of the crude protein of the feed.

3. The compound feed according to claim 2, characterized in that the crude protein content is at least 9% by weight.

4. The compound feed according to claim 2, characterized in that the feed components are of plant origin.

5. The compound feed according to claim 2, characterized in that the histidine is protected against rumen degradation.

6. The compound feed according to claim 2, characterized in that it has been processed by treating it with heat and/or steam.

7. The compound feed according to claim 1, characterized in that the crude protein content is at least 9% by weight.

8. The compound feed according to claim 7, characterized in that the feed components are of plant origin.

9. The compound feed according to claim 7, characterized in that the histidine is protected against rumen degradation.

10. The compound feed according to claim 1, characterized in that the feed components are of plant origin.

11. The compound feed according to claim 10, characterized in that the histidine is protected against rumen degradation.

12. The compound feed according to claim 1, characterized in that the histidine is protected against rumen degradation.

13. The compound feed according to claim 1, characterized in that it has been processed by treating it with heat and/or steam.

14. The compound feed according to claim 1, characterized in that it contains

|  | % by weight |
| --- | --- |
| grain (barley, oat) | 0–85 |
| bran (wheat, oat) | 0–60 |
| wheat middlings | 0–30 |
| sugarbeet pulp | 0–60 |
| oil seed meal (rapeseed, soya) | 0–30 |
| molasses | 0–10 |
| minerals | 0–10 |
| vegetable oil | 0–5 |
| histidine | 0.01–0.2. |

15. The compound feed according to claim 14, characterized in that it contains

|  | % by weight |
| --- | --- |
| grain (barley, oat) | 30–40 |
| bran (wheat, oat) | 15–20 |
| wheat middlings | 5–10 |
| sugarbeet pulp | 10–20 |
| oilseed meal (rapeseed, soya) | 10–20 |
| molasses | 4–6 |
| minerals | 3–4 |
| vegetable oil | 0–1 |
| histidine | 0.01–0.2. |

16. The compound feed according to claim 1, characterized in that the histidine content is 2.8 to 3.0% by weight of the crude protein of the feed.

17. The compound feed according to claim 1 characterized in that the crude protein content is 10 to 12% by weight.

18. A process for the preparation of a compound feed for increasing the milk protein-fat ratio and improving nitrogen utilization according to claim 1 characterized in that a) the compound feed component are combined with such a quantity of histidine so as to obtain a feed mixture having a crude protein content of not more than 14% by weight and a histidine content of at least 2.8% by weight of the crude protein, or b) the components of the compound feed mixture are combined in a qualitative and quantitative manner so that the crude protein content of the feed mixture obtained is not more than 14% by weight and the histidine content is at least 2.8% by weight of the crude protein.

19. The method of claim 18 wherein the histidine content is 2.8 to 4.0% by weight of the crude protein.

20. The method according to claim 18, characterized in that the histidine in a), is in protected form.

21. The process according to claim 18, characterized in that the histidine is in protected form.

22. A method for increasing the protein-fat-ratio of milk and improving nitrogen utilization in a dairy cow, characterized in that the diet of the cow, is supplemented with a histidine enriched compound feed according to claim 1.

23. The method of claim 22 wherein said diet is a silage diet.

24. The method according to claim 22, characterized in that the compound feed supplement is 1 to 20 kg/cow/day.

25. A silage based method of feeding cows for increasing the milk protein-fat ratio and improving nitrogen utilization characterized in that the silage of cows is supplemented with a histidine enriched compound feed according to claim 1.

* * * * *